Figure 5:
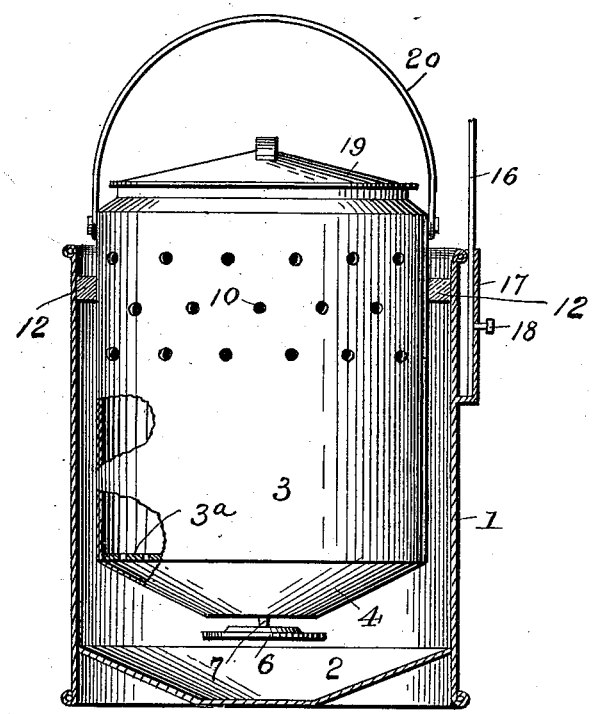

(No Model.) 2 Sheets—Sheet 1.
M. L. JULIAN.
DISH CLEANER.
No. 554,937. Patented Feb. 18, 1896.
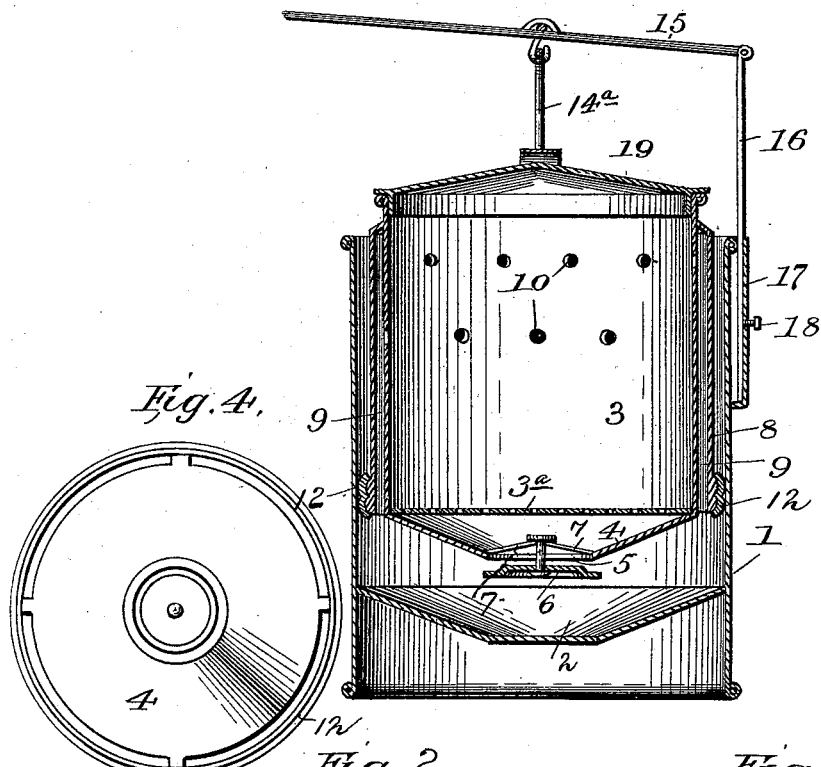
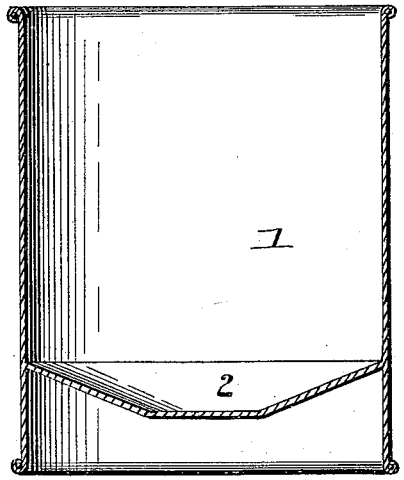
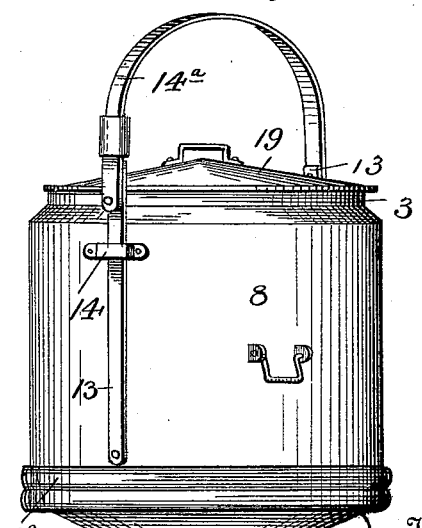
Witnesses:
F. L. Ouraud
Jos. L. Coombs
Inventor:
Motier L. Julian
by Louis Bagger & Co
Attorneys (No Model.) 2 Sheets—Sheet 2.

M. L. JULIAN.
DISH CLEANER.

No. 554,937. Patented Feb. 18, 1896.

Witnesses:
F. L. Ourand
W. L. Coombs

Inventor:
Motier L. Julian,
by Louis Bagger & Co
Attorneys.

UNITED STATES PATENT OFFICE.

MOTIER L. JULIAN, OF FAIRFIELD, IOWA.

DISH-CLEANER.

SPECIFICATION forming part of Letters Patent No. 554,937, dated February 18, 1896.

Application filed March 21, 1895. Serial No. 542,676. (No model.)

*To all whom it may concern:*

Be it known that I, MOTIER L. JULIAN, a citizen of the United States, and a resident of Fairfield, in the county of Jefferson and State of Iowa, have invented certain new and useful Improvements in Dish-Washing Machines; and I do hereby declare that the following is a full, clear, and exact description of the invention, which will enable others skilled in the art to which it appertains to make and use the same, reference being had to the accompanying drawings, which form a part of this specification.

My invention relates to dish-washing machines, and its object is to provide an improved construction of the same which shall possess superior advantages with respect to efficiency in operation.

The invention consists in the novel construction and combination of parts hereinafter fully described and claimed.

In the accompanying drawings, Figure 1 is a longitudinal sectional view of a dish-washing machine constructed in accordance with my invention. Figs. 2 and 3 are similar views of the inner and outer vessels. Fig. 4 is a bottom view of the inner vessel. Fig. 5 is a longitudinal sectional view of a modified construction.

In the said drawings, the reference-numeral 1 designates an outer cylindrical vessel having a conical bottom 2. Located within this outer vessel is an inner vessel, 3, having a conical bottom 4 to correspond with the bottom of vessel 1. This bottom 4 is provided with a central opening 5 and a valve 6, which is provided with a stem 7 working in a spider secured to said bottom. The construction of the valve is such that it will open when the vessel 3 is elevated and close when it is depressed. A perforated metal disk 3ª is inserted in the vessel 3 to protect the valve. The said vessel 3 is provided with a jacket 8, concentric therewith, closed at the top and open at the bottom, forming an annular chamber 9. The inner vessel is also provided with a series of perforations or openings 10 leading into said chamber. The lower end of the jacket is provided with a peripheral packing-ring 12, of rubber or other suitable material. Pivoted to said jacket near the lower end are upwardly-extending links 13, which pass between guides 14. Connected with these links is a bail 14ª, which in turn is secured to a horizontal lever 15 pivoted at one end to an adjustable rod 16, which works in a way 17 formed by a curved metal plate secured to the vessel 1. A set-screw 18 holds the rod in position when adjusted.

The numeral 19 designates a cover for the vessel 3.

The operation is as follows: The vessel 3 is placed in vessel 1, and water and the articles to be washed placed in said vessel 3. By raising the lever the can 3 will be elevated, opening the valve in the bottom and allowing water to escape into vessel 1. By pressing down on the lever the vessel 3 will be depressed, closing the valve and forcing the water up between the vessel and its jacket, and forcing it through the perforations 10, thus thoroughly washing the articles. The up-and-down movement of the vessel 3 by the movement of the lever is effected through the medium of the links and bail.

In Fig. 5 I have shown a modified construction, which, however, does not differ in principle from that shown in the other figures. In this instance the jacket is dispensed with, and the apertures 10 in the inner vessel, 3, communicate with the space between the inner vessel, 3, and the outer vessel, 1. The inner vessel is provided with a valve 6 and in its bottom a perforated disk 3ª above the same. At its upper end it is provided with a bail 20, which may be operated directly by hand, or by means of a lever, as in Fig. 1. A packing-ring 12 is secured to the interior of the vessel 3, near the top thereof. The operation is the same as that before described with reference to the other figures.

Having thus fully described my invention, what I claim is—

In a dish-washing machine, the combination with the outer stationary cylindrical vessel, the cylindrical jacket closed at its upper end and open at the lower end, the packing secured to said jacket, and the verticallymovable inner cylinder, of the links pivoted to said jacket, the guides through which said links pass, the bail connected with the upper ends of said links, the adjustable rod, and the horizontal lever pivoted thereto and pivotally connected with the said bail, substantially as described.

In testimony that I claim the foregoing as my own I have hereunto affixed my signature in presence of two witnesses.

MOTIER L. JULIAN.

Witnesses:
FRANK H. HIGBY,
FRANK LORING.